(12) United States Patent
Cheung et al.

(10) Patent No.: US 6,809,427 B2
(45) Date of Patent: Oct. 26, 2004

(54) ELECTRICAL GENERATOR WITH FERROFLUID BEARINGS

(75) Inventors: Jeffrey T. Cheung, Thousand Oaks, CA (US); Hao Xin, Sherman Oaks, CA (US)

(73) Assignee: Rockwell Scientific Licensing, LLC, Thousand Oaks, CA (US)

(*) Notice: Subject to any disclaimer, the term of this patent is extended or adjusted under 35 U.S.C. 154(b) by 0 days.

(21) Appl. No.: 10/770,957

(22) Filed: Feb. 2, 2004

(65) Prior Publication Data

US 2004/0155467 A1 Aug. 12, 2004

Related U.S. Application Data

(62) Division of application No. 10/078,724, filed on Feb. 19, 2002.

(51) Int. Cl.$^7$ ............................................. H02P 9/04
(52) U.S. Cl. ........................................ 290/1 R; 310/66
(58) Field of Search .................... 290/1 R; 322/3; 310/66

(56) References Cited

U.S. PATENT DOCUMENTS

| | | | |
|---|---|---|---|
| 3,573,479 A | * 4/1971 | Rieth | 290/1 E |
| 3,726,574 A | 4/1973 | Tuffias et al. | 308/36.3 |
| 3,746,407 A | 7/1973 | Stiles et al. | 308/36.3 |
| 3,834,775 A | 9/1974 | Tuffias et al. | 308/36.3 |
| 3,977,739 A | 8/1976 | Moskowitz et al. | 308/187 |
| 4,064,409 A | 12/1977 | Redman | 310/306 |
| 4,171,818 A | 10/1979 | Moskowitz et al. | 277/80 |
| 4,260,901 A | 4/1981 | Woodbridge | 290/42 |
| 4,356,098 A | 10/1982 | Chagnon | 252/62.51 |
| 4,357,024 A | 11/1982 | Raj | 277/1 |
| 4,430,239 A | 2/1984 | Wyman | 252/62.51 |
| 4,485,024 A | 11/1984 | Furumura et al. | 252/62.56 |
| 4,673,997 A | 6/1987 | Gowda et al. | 360/107 |
| 4,687,596 A | 8/1987 | Borduz et al. | 252/510 |
| 4,706,498 A | 11/1987 | Nemnich et al. | 73/516 |
| 4,709,176 A | 11/1987 | Ridley et al. | 310/15 |
| 4,732,706 A | 3/1988 | Borduz et al. | 252/510 |
| 4,734,606 A | 3/1988 | Hajec | 310/90.5 |
| 4,797,013 A | 1/1989 | Raj et al. | 384/462 |
| 4,898,480 A | 2/1990 | Raj et al. | 384/446 |
| 4,938,886 A | 7/1990 | Lindsten et al. | 252/62.51 |
| 5,085,789 A | 2/1992 | Yokouchi et al. | 252/62.52 |
| 5,175,457 A | 12/1992 | Vincent | 310/15 |
| 5,323,076 A | 6/1994 | Hajec | 310/90 |
| 5,341,055 A | 8/1994 | Roche | 310/24 |
| 5,347,186 A | 9/1994 | Konotchick | 310/17 |
| 5,417,507 A | 5/1995 | Uno et al. | 384/107 |
| 5,444,313 A | 8/1995 | Oudet | 310/17 |
| 5,452,520 A | 9/1995 | Raj et al. | 33/366 |
| 5,490,425 A | 2/1996 | Raj et al. | 73/745 |
| 5,552,973 A | 9/1996 | Hsu | 362/192 |
| 5,780,741 A | 7/1998 | Raj | 73/514.08 |
| 5,818,132 A | 10/1998 | Konotchick | 310/17 |
| 5,899,220 A | 5/1999 | Alcocer et al. | 137/13 |
| 6,020,664 A | 2/2000 | Liu et al. | 310/90 |
| 6,056,889 A | 5/2000 | Tsuda et al. | 252/62.52 |
| 6,140,730 A | 10/2000 | Tkaczyk et al. | 310/191 |
| 6,208,743 B1 | 3/2001 | Marten et al. | 381/415 |
| 6,261,471 B1 | 7/2001 | Tsuda et al. | 252/62.52 |
| 6,277,298 B1 | 8/2001 | Borduz et al. | 252/62.52 |
| 6,768,230 B2 * | 7/2004 | Cheung et al. | 310/30 |
| 2003/0155827 A1 | 8/2003 | Cheung et al. | 310/90.5 |
| 2003/0155828 A1 | 8/2003 | Cheung et al. | 310/90.5 |

* cited by examiner

Primary Examiner—Nicholas Ponomarenko
(74) Attorney, Agent, or Firm—Koppel, Jacobs, Patrick & Heybl (57) ABSTRACT

An electrical generator includes a magnet constrained to move relative to a conductor by a support structure, with a ferrofluid bearing providing an ultra low friction interface between the magnet and support structure. The assembly has a critical angle of displacement from a horizontal static position of less than 1 degree, and preferably less than 10 minutes. An electrical signal is generated in the conductor by the moving magnetic field.

24 Claims, 5 Drawing Sheets

ELECTRICAL GENERATOR WITH FERROFLUID BEARINGS

RELATED APPLICATION

This application is a divisional of Ser. No. 10/078,724, filed Feb. 19, 2002 by the present inventors.

BACKGROUND OF THE INVENTION

1. Field of the Invention

This invention relates to the generation of electrical energy by the movement of a magnet within a coil, and more particularly to an ultra low friction bearing for the magnet.

2. Description of the Related Art

Moving a magnet through a conductive coil induces an electromotive force that generates a current in the coil. If the magnet is moved back and forth in a reciprocating motion, the direction of current flow in the coil will be reversed for each successive traverse, yielding an AC current.

Several electrical generating systems have been developed that make use of reciprocating magnet movement through one or more coils. For example, in U.S. Pat. No. 4,260,901, wave motion in a body of water causes a float to move up and down, which in turn imparts a reciprocating motion to a magnet that travels between a pair of coils stationed at opposite ends of its path. In U.S. Pat. No. 5,347,186, a rare earth magnet and a coil are positioned to move linearly back and forth relative to each other. The magnet can either be fixed and the coil moved up and down relative to the magnet, as by wave action, the coil fixed and the magnet moved relative to the coil as by pneumatic pressure, or the coil housing shaken or vibrated, as by being carried by a jogger, to cause a reciprocating motion of a magnet which moves within the coil. In U.S. Pat. No. 5,818,132, a moving magnet is confined to a bi-directional linear or near linear motion through each of at least two mutually spaced coils for providing power in applications such as long life flashlights, alarms systems, communication devices located at places where conventional electric power sources are unavailable, and relatively high power repetitive forces such as the forces on the heel of a shoe during walking or running.

In each of these applications it is necessary to either hold the magnet or coil stationary and forcefully move the other component, or apply a vigorous shaking or vibrating motion to a housing for the assembly so that the magnet moves relative to the coil. This makes the devices unsuitable for applications in which only a gentle actuating force is available to move the housing, particularly if the movement is in a generally horizontal direction. Thus, in the example of a hand held flashlight with a magnet and coil assembly for supplying power to the bulb, simply holding the flashlight in the user's hand while walking so that it moves in a shallow, generally horizontal arc corresponding to the user's hand motion, may be insufficient to cause adequate motion of the magnet relative to the housing.

SUMMARY OF THE INVENTION

The present invention seeks to provide a new electrical generator system and method in which frictional forces between a magnet and support structure are so low that relative movement between the magnet and a proximate conductive coil is sufficient for useful electrical power generation, even if the movement is horizontal and only a slight movement is imparted to the support structure.

These goals are achieved with an electrical generator in which a magnet is arranged to move relative to a support structure, the assembly having a critical angle of displacement from a horizontal static position of less than 1 degree, and even of less than 10 minutes. This ultra low friction level can be achieved with a ferrofluid bearing that provides a low friction interface between the magnet and support structure. A conductor, preferably a coil, is arranged with respect to the magnet so that an electrical signal is generated in the conductor and coupled out of the system in response to the magnet moving on its support structure. The ferrofluid preferably has a viscosity less than about 5 centipoise, and in a particular embodiment comprises a light mineral oil medium mixed with isoparaffinic acid.

In one embodiment, the magnet moves within an enclosure and produces a moving magnetic field that generates an electrical signal in a surrounding conductive coil. An air flow path is provided between opposite sides of the magnet which it moves, preferably by the magnet occupying less than the full interior cross-sectional area of the enclosure, to prevent a pressure buildup that could retard the magnet movement. For a hand held device, the enclosure can be curved to generally match the arc of an arm swing. The enclosure can be housed in a buoyant outer enclosure to that the unit generates an electrical signal when the outer enclosure is floating and subjected to wave action, or the unit can be suspended to generate an electrical signal in response to wind. Representative applications include battery charging systems, flashlights, environmental sensors, emergency transmitters and cellular telephones.

These and other features and advantages of the invention will be apparent to those skilled in the art from the following detailed description, taken together with the accompanying drawings.

DETAILED DESCRIPTION OF THE INVENTION

The present invention provides an ultra low degree of friction between a magnet and a support structure for the magnet, allowing for useful generation of electricity from very slight movements of the support structure off a horizontal plane and/or movements in a horizontal plane. For example, a walking motion or other normal motions such as turning, tapping, bowing, or even riding in a vehicle that is subject to vibration, can easily generate a useful amount of electricity when the support structure is held in the user's hand or in a shirt pocket, while slight off-horizontal movements due to wave or wind action can also be used for electrical generation.

To enable a highly sensitive response of the magnet to movements of its support structure, ferrofluid bearings are preferably employed as an interface between the magnet and support structure. Ferrofluids are dispersions of finely divided magnetic or magnetizable particles, generally ranging between about 30 and 150 Angstroms in size, and dispersed in a liquid carrier. The magnetic particles are typically covered with surfactants or a dispersing agent. The surfactants assure a permanent distance between the magnetic particles to overcome the forces of attraction caused by Van der Waal forces and magnetic interaction, and also provide a chemical composition on the outer layer of the covered particles which is compatible with the liquid carrier and the chemicals in the surrounding environment. Ferrites and ferric oxides employed as magnetic particles offer a number of physical and chemical properties to the ferrofluid, including saturation magnetization, viscosity, magnetic stability, and chemical stability. Several types of ferrofluids are provided by Ferrotec (USA) Corporation of Nashua, N.H. A summary of patents related to the preparation of ferrofluids is provided in U.S. Pat. No. 6,056,889.

Ferrofluids have been used previously in electrically driven systems. For example, U.S. Pat. No. 5,323,076 discloses a disk spindle motor in which a ferrofluid lubricant is used as an alternative to ball bearings for a rotating electrically driven spindle. In U.S. Pat. No. 5,452,520, ferrofluid bands provide bearings for a magnet that slides within an inclinometer, with movements of the magnet away from a neutral position detected by a Hall element or coil, and used to energize coils at each end of the device which restore the magnet to its neutral position.

An effort has also been made to employ ferrofluids in the generation of electricity to power external systems. U.S. Pat. No. 4,064,409 utilized the characteristic of ferrofluids experiencing rapid changes in their magnetic properties with changing temperature, by placing a magnet around a closed circuit ferrofluid system to create a self-pumping action of the ferrofluid through a solenoid that generates electric power. However, this type of system requires an external heat source and is not conducive to remote or portable operation.

Applicants have discovered a new way to utilize ferrofluids in the generation of electrical energy used to power systems external to the generator itself. This new approach is based upon the low friction characteristics of ferrofluids, rather than their change in magnetic properties with temperature. A reciprocating system is provided in which a magnet moves relative to a conductive coil to induce an emf in the coil and thereby generate a current flow. With the use of a properly selected ferrofluid lubricant for the magnet, an extremely low coefficient of friction is provided that allows the magnet to move and generate electricity in response to very slight tilting or translation movements imparts to its enclosure. It is not necessary to vigorously shake the apparatus or hold it vertically, as in prior moving magnet generators.

The characteristics of the ferrofluid and magnet are related. If the magnet has a relatively low magnetic field, a ferrofluid of relatively high magnetization should be used. The magnet's magnetic field will typically range from about 500–4,000 Gauss, and the magnetization of the ferrofluid from about 50–400 Gauss.

The ferrofluid's frictional coefficient is roughly related to its viscosity (measured in centipoise (cp)), but not directly. For example, a ferrofluid with a viscosity of 300 cp has been found to have a static friction coefficient of about 0.015, the EFH1 ferrofluid from Ferrotec (USA) Corporation has a viscosity on the order of 6 cp and a static friction coefficient of about 0.002, but a water based ferrofluid with a viscosity of 5 cp has been found to have a static friction coefficient of about 0.01. The high friction coefficient for the somewhat lower viscosity composition has been attributed to a surface tension associated with the water based solvent.

A preferred ferrofluid composition for the present invention has a viscosity substantially less than 5 cp, actually less than 2 cp, and achieves an ultra low coefficient of static friction in the range of 0.0008–0.0012. This is sensitive enough for a magnet on a beam to begin sliding when the beam is tilted only about 0.070 off horizontal. This and other suitable ferrofluid compositions are discussed in copending patent application Ser. No. 10/078,132, entitled "Mechanical Translator With Ultra Low Friction Ferrofluid Bearings", filed on the same day as the present invention by applicant Jeffrey T. Cheung, and also assigned to Innovative Technology Licensing, LLC, the assignee of the present invention, the contents of which application are hereby incorporated herein by reference. The composition comprises a mixture of one part Ferrotec (USA) Corporation EFH1 light mineral oil ferrofluid, mixed with from two to four parts of isoparaffinic acid, stirred for 24 hours. Suitable sources of isoparaffinic acid are Isopar 6 and Isopar M hydrocarbon fluids from Exxon Mobil Chemical Corp. Undiluted EFH1 ferrofluid could also be used. Undiluted EFH1 composition has a greater weight bearing capacity than the diluted version, but diluting the composition will retain sufficient weight bearing capability for most applications. Other ferrofluids with static friction coefficients up to about 0.02 could also be used, such as Ferrotec (USA) Corporation type EMG 805, a water based ferrofluid with a static friction coefficient of about 0.01 and a viscosity of about 5 cp, since the power output achievable with a 0.01 static friction coefficient is still about 75% that achievable with a zero friction system. At present the EMG 805 composition is considerably more expensive than the EFH1 composition and has a somewhat lesser load bearing capability.

Figure 1:
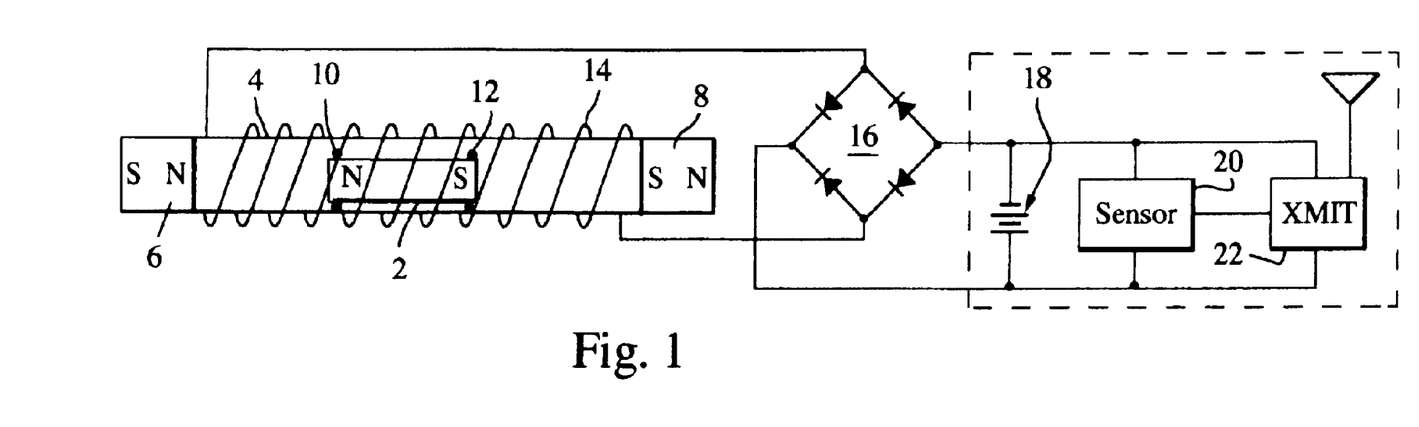
FIGS. 1 and 2 are schematic diagrams illustrating the application of the invention to environmental sensor and emergency transmitting applications, respectively.

FIG. 1 illustrates the application of the invention to an environmental sensor. A movable permanent magnet 2 is housed within a nonmagnetic enclosure 4, with magnets 6 and 8 at opposite ends of the enclosure in axial polar opposition to central magnet 2. Thus, the ends of the moving and end magnets which face each other are of like magnetic polarity so that the kinetic energy of the moving magnet is converted to potential energy as it approaches an end magnet, and then back to kinetic energy as it is repelled away from the end magnet. A ferrofluid within the enclosure is naturally attracted to the poles of magnet 2 to form beads 10, 12 around the end poles of the magnet. This provides an ultra low friction lubricant that allows the magnet 2 to freely move within the enclosure, which provides a supporting structure for the magnet. The magnet will move relative to the enclosure in response to either a tilting of the enclosure away from horizontal, or a horizontal movement of the enclosure.

A conductive coil 14, typically copper, is wound around at least a portion of the enclosure that is traversed by the magnet 2 in its path between the end magnets 6 and 8. Movement of the magnet relative to its enclosure generates a current in coil 14, due to the magnet's moving magnetic field cutting the turns of the coil. The repulsive effect of end magnets 6 and 8 limit the travel of moving magnet 2 with a cushioning effect that prevents it from striking the hard end magnets. Since the magnetic repulsion force varies with $1/d^4$, where d is the difference between two magnets, the repulsive force increases very rapidly as the moving magnet approaches one of the end magnets.

Magnet 2 and enclosure 4 both preferably have generally circular cross-sections. The dimensions of the components are preferably selected to leave a gap between the ferrofluid beads 10 and 12 and the upper enclosure wall, thereby preventing an air buildup on one side of the sliding magnet and a partial vacuum on the other side that could otherwise develop and retard the magnet's movement. Alternatively, the magnet could be perforated to allow an air flow between its opposite sides if it is desired that (together with the ferrofluid bearings) it occupy the full cross-sectional inner area of the enclosure.

A movement imparted to the enclosure 4 causes the magnet 2 to reciprocate back and forth between the end magnets 6, 8. Depending upon the particular application, the enclosure movement can be a single axial movement, reciprocating along a longitudinal axis, pivoting about a center axis, rotational, or other more complex forms of movement. As the magnet 2 moves back and forth, it generates an AC current in the coil 14. In the embodiment illustrated in FIG. 1, this current is rectified by a bridge circuit 16 and used to charge a battery 18, which provides a power source for an environmental sensor 20 that can sense one or more environmental conditions such as temperature, pressure, gases, radiation or the like. To establish the sensor at a remote location, a transmitter 22 can be provided to transmit information concerning the sensed condition, with the transmitter also operated off of battery 18. Alternately, the sensor 20 can be operated in real time, directly from the output of coil 14 or bridge circuit 16, by eliminating the battery 18.

Figure 2:
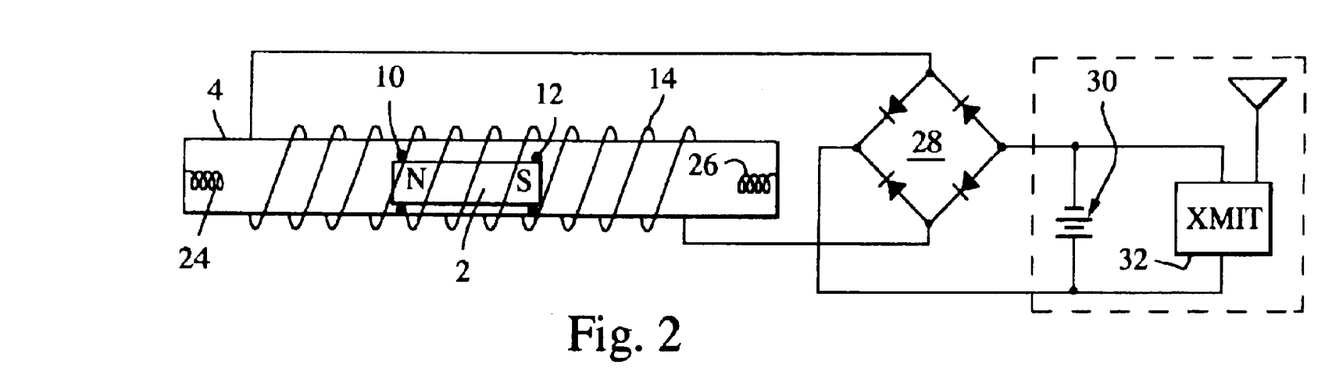

The application of the invention to an emergency transmitter is illustrated in FIG. 2. The same ferrofluid libricated electrical generator as in FIG. 1 is illustrated, except in this embodiment the end magnets have been replaced with springs 24, 26. This version provides a gentler stop to the moving magnet, since the spring force increases generally linearly rather than in proportion to $1/d^4$ as with end magnets, but it has the disadvantage of physically contacting the reciprocating magnet 2 at each end of its travel and possibly damaging the magnet through repeated contacts over time.

The coil output is connected to a rectifying bridge circuit 28, the output of which charges a battery 30 that powers an emergency transmitter 32. Applications for this system include a wave-powered generator for transmitting emergency signals at sea, and a wind-powered system for land transmissions, illustrated respectively in FIGS. 6 and 7.

Figure 3:
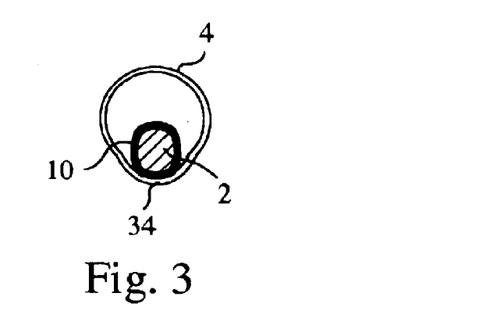
FIG. 3 is a section view of an embodiment in which a magnet slides along a raceway formed in the enclosure.

FIG. 3 illustrates one possible configuration for the enclosure 4 in which a shaped raceway 34 is provided in the wall of an otherwise circular cross-sectional enclosure, with the magnet 2 dimensioned so that it slides in the raceway and avoids lateral motion. This is useful for applications in which the enclosure experiences movements in the lateral direction, as well as in the plane of the magnet travel, helping to confine the magnet to a longitudinal movement.

The enclosure 4 which provides a support structure for the magnet preferably has a smooth, nonporous surface that does not absorb the ferrofluid. Materials such as polycarbonates and glass are suitable, while Teflon® is not desirable because it tends to absorb the ferrofluid.

Figure 4:
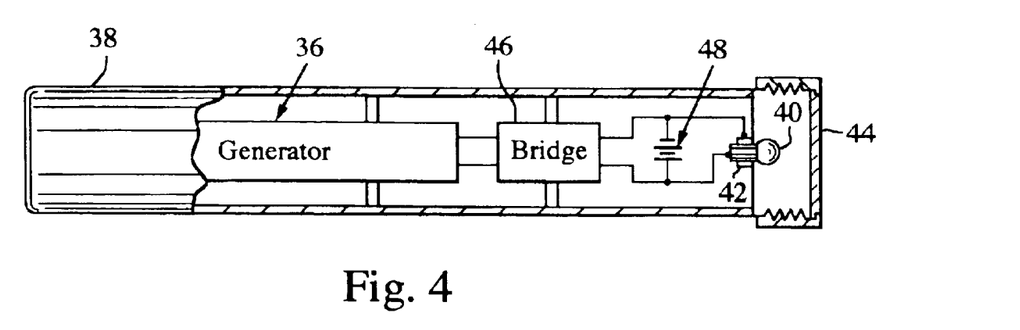
FIG. 4 is a schematic diagram of the invention applied to a flashlight.

The invention has many applications, a few of which are illustrated herein. FIG. 4 illustrates the invention as applied to a hand held flashlight. An electrical generator 36 as described above is provided within a flashlight housing 38, with an illuminating bulb 40 at one end held to a bulb contact 42 and emitting light through a transparent plate 44 that can be screwed off to access the bulb. As with the other embodiments described above, the generator 36 provides an AC output that is rectified by a bridge circuit 46 which charges a battery 48 connected in circuit with the bulb contact 42. Again, the battery can be eliminated if real time flashlight operation is desired, and in any application of the invention the bridge circuit can be eliminated if it is desired to operate directly from an AC signal.

Figure 5:
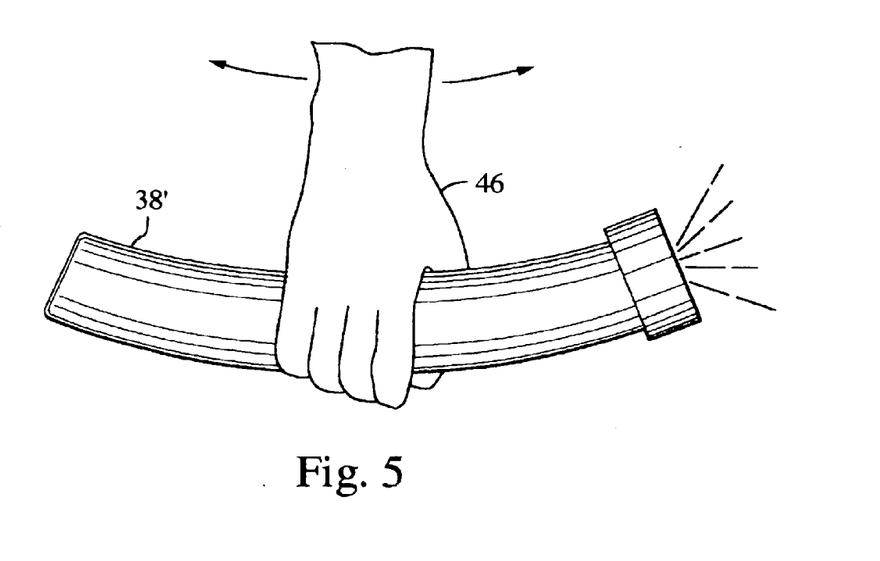
FIG. 5 is an elevation view illustrating a curved flashlight that is operated in response to the user's hand motion while walking.

FIG. 5 illustrates a variation in which the longitudinal axis of a flashlight housing 38' is curved along an arc, rather than straight; numerous other ergonometric designs could also be envisioned. The flashlight would be held in a person's hand 46, with its curvature designed to match the arc through which the person's hand swings while walking. This provides a smoother movement between the magnet and its enclosure during a normal walking movement.

Figure 6:
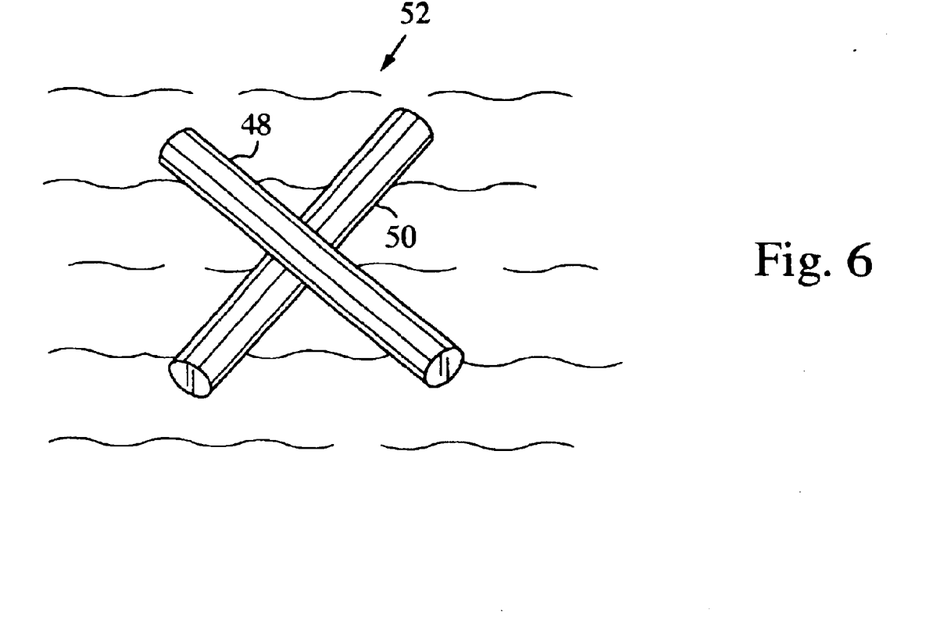
FIG. 6 is a simplified perspective view of an electrical generator in accordance with the invention actuated in response to wave motion.

An electrical generator operated by wave action is illustrated in FIG. 6. This system is useful for powering an emergency transmitter, a repeater station for underwater cable, and for other marine applications requiring an electrical power source that is not otherwise available. In the illustrated embodiment, a pair of buoyant tubular enclosures 48, 50 are connected transverse to each other at their midsections. Each enclosure houses an electrical generator as described above, and any associates electronics. When left to float in water 52, the two generators will be more stable and sensitive to wave action in different directions than a single generator. Their outputs can be combined to produce a steadier supply of power than with a single generator. Other configurations of multiple enclosures or a single shaped enclosure could also be used, such as linear arrays, three-dimensional arrays, triangles and other geometric shapes.

Figure 7:
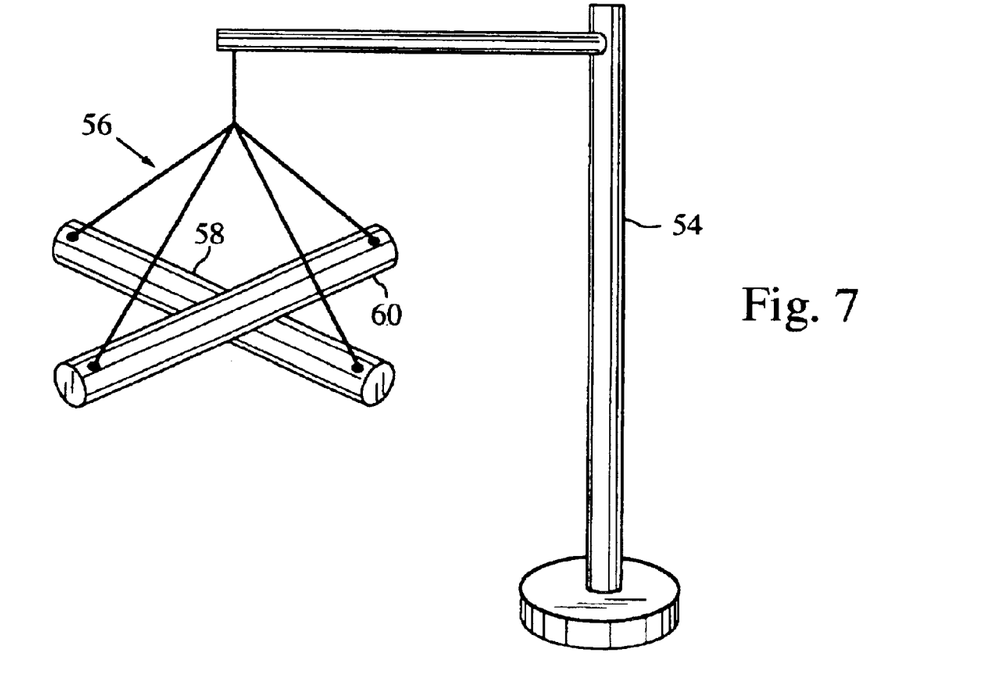
FIG. 7 is a simplified perspective view of an electrical generator in accordance with the invention actuated in response to air motion.

FIG. 7 illustrates a wind-powered device that is similar to the marine generator of FIG. 6, but is suspended in air and moved by the wind to generate electricity. A support structure 54 includes a suspension system 56 that suspends the apparatus in the air, where it can be blown by the wind. Again, the electrical generation apparatus is illustrated as a pair of tubular electrical generators 58, 60 that are transverse to each other and connected at their midsections, with the ends of the tubes attached to the support structure. Wind vanes or other embellishments can be added to increase the generator's profile and make it more sensitive to wind. As the enclosures swings off-horizontal due to wind action, the magnets they house move along the tubes to produce an electrical output.

Figure 8:
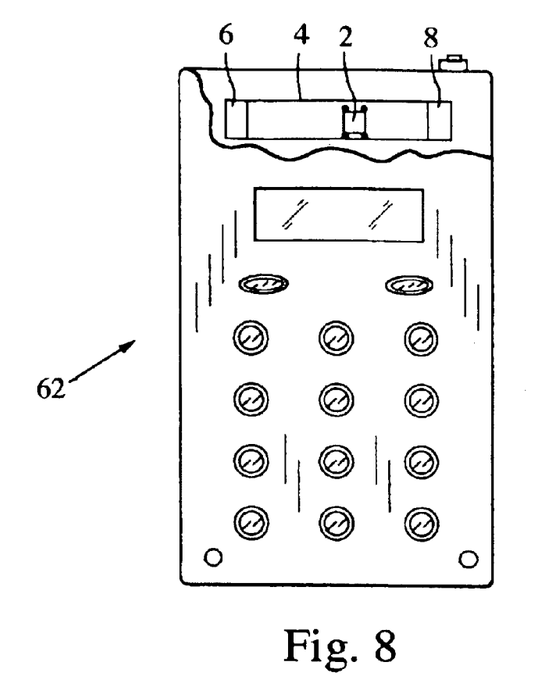
FIG. 8 is a simplified plan view of a cellular telephone powered in accordance with the invention.

FIG. 8 illustrates the application of the invention to a cellular telephone 62 that can be placed in a person's shirt pocket or belt clip; for purposes of simplification the coil or coils wound on the magnet enclosure 4 are not shown. A battery and associated rectifying circuitry as in the other applications for the invention described above would be provided within the telephone housing.

The magnet enclosure 4 is supported within the cell phone 62 so that it has a generally horizontal orientation when the phone is place upright in the user's shirt pocket or held in a belt clip. The motion sensitivity achieved with the invention allows power outputs on the order of 0.4 watts to be readily achieved with the movement accompanying a normal walking motion, whereas a typical cell phone presently consumes an average power of about 0.2 watts. Thus, cell phones and like devices constitute an important application for the invention.

The invention has many other applications involving devices that are hand held, portable or otherwise subject to motion. For example, an electrical generator as described herein could be installed on the axle of an automobile or other vehicle to capture vibrations from the vehicle's movement, and used to generate electrical power for air pressure sensors embedded in the vehicle tires. The pressure information could be transmitted to a driver display to provide a warning of low or high pressure conditions.

Figure 9:
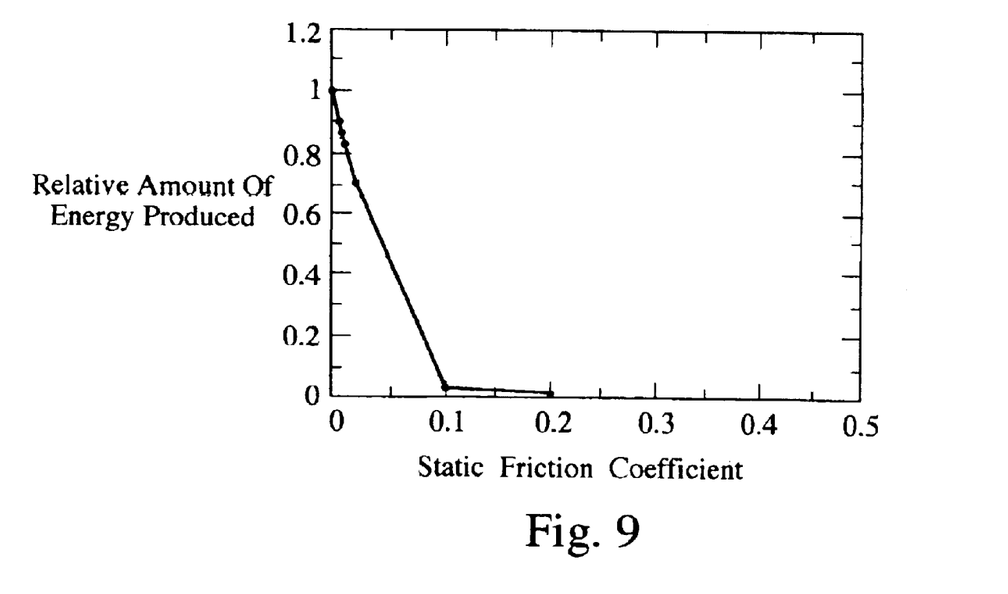
FIG. 9 is an illustrative graph of the energy produced by an oscillating magnet system as a function of the static coefficient of friction between the magnet and its support structure.

The achievement of an ultra low friction interface between the moving magnet and the walls of its enclosure is an important aspect of successfully implementing the invention. FIG. 9 graphically illustrates the relative amount of energy produced, on a normalized basis, as a function of the static friction coefficient between the magnet and the enclosure, for a horizontally oriented enclosure subjected to movements typical of being carried while walking. It can be seen that the output energy drops rapidly from a frictionless system to a very low level at a static friction coefficient of 0.1, with a more gradual dropoff after that until no output is achieved with a coefficient greater than about 0.2. With the use of ferrofluid bearings that preferably provide an ultra low static friction coefficient of about 0.01 or less, the invention is capable of near optimum energy outputs.

Figure 10:
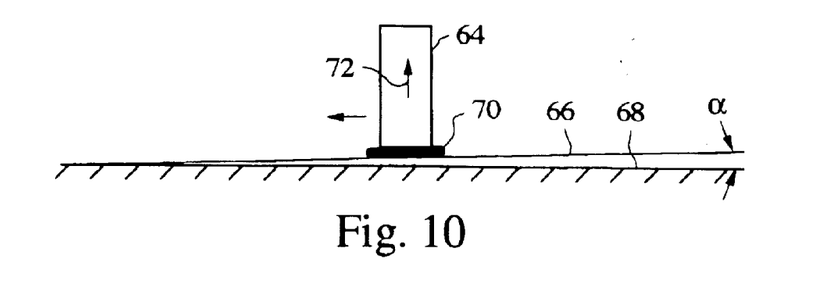
FIG. 10 is a diagram illustrating the ultra low friction that can be achieved with a new ferrofluid lubricant.

The ultra low friction achievable with specific ferrofluids is illustrated by FIG. 10. A magnet 64 is shown supported on a substrate 66, which in turn is on a horizontal support surface 68. A ferrofluid bearing 70 provides an ultra low friction interface between the magnet 64 and substrate 66. The magnet is shown oriented with its magnetic axis 72 generally transverse to the substrate 66.

With the use of an appropriate ferrofluid 16, ultra low degrees of friction can be achieved between the magnet and substrate, making the magnet highly responsive to a tilting of the substrate or an applied translational force applied to the magnet. The static friction coefficient was measured by raising one end of the substrate 66 off the horizontal surface 68 until the magnet began to slide along the substrate, determining the substrate's critical off-horizontal angle of displacement at which sliding movement began, returning the substrate to horizontal, lifting its other end until the magnet started to slide in the opposite direction, determining the critical angle of displacement from horizontal for sliding to begin in that direction, and averaging the two angles. With an EFH1/isoparaffinic acid mixture as described above, the magnet began to slide at an average angle of much less than 0.1 degree, and even considerably less than 10 minutes. In fact, the critical angle for displacement from a horizontal static position was found to be approximately 0.07 degree.

Figure 11:
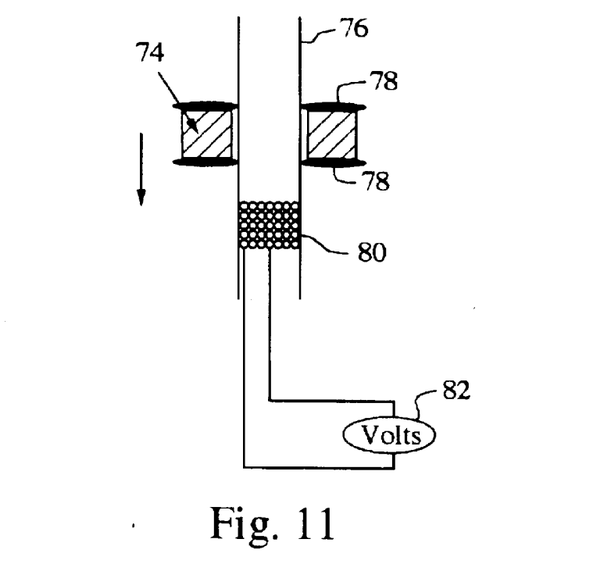
FIG. 11 is a sectional view of an embodiment with a magnet outside a housing and a pickup coil inside.

While several embodiments of the invention have been shown and described, numerous additional variations and embodiments will occur to those skilled in the art. For example, rather than moving the enclosure as illustrated, the enclosure could be held in place and the magnet moved, such as by a piston. Also, instead of placing the magnet inside a housing and winding the coil around the outside of the housing, the elements could be reversed with the coil inside the magnet. This variation is illustrated in FIG. 11, in which a toroidal shaped magnet 74 whose magnetic field is aligned with its axis slides freely over a tube 76 on ferrofluidic bearings 78. An electrical coil 80 is located inside the tube. As the magnet slides over the tube in the vicinity of the coil, an electrical output is produced by the coil and detected by voltmeter 82. This variation can be used by itself, or coupled with an additional outer coil that surrounds the magnet.

Figure 12:
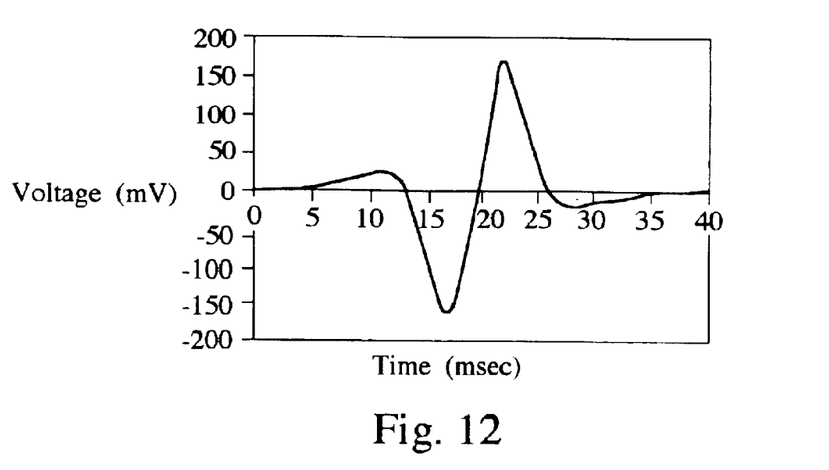
FIG. 12 is a graph of output voltage produced with the device shown in FIG. 11.

The signal produced with one example of the FIG. 11 design is shown in FIG. 12. A 268 turn coil was placed inside a 1.054 cm outside diameter, 0.762 cm inside diameter tube. The magnet was a ceramic disk with a 1.27 cm diameter opening through its center, dropped from a height of 40 cm. The resulting AC voltage output had a peak of about 160 mV.

Accordingly, it is intended that the invention be limited only in terms of the appended claims.

We claim:

1. An electrical system, comprising:

a magnet constrained to move relative to a support structure, a ferrofluid disposed between said magnet and support structure to provide a low friction interface, a conductive coil disposed with respect to said magnet so that relative movement between said magnet and said coil generates an electrical signal in said coil, a pair of end magnets on opposite sides of, and opposing polarity to, said magnet to limit said magnet's movement, and an operating system coupled to be provided with electrical energy by said electrical signal.

2. The electrical system of claim 1, wherein said coil is disposed along a portion of said support structure which is traversed by said magnet's movement.

3. The electrical system of claim 1, wherein said magnet is arranged with respect to said support structure to provide an air flow path between opposite sides of the magnet when the magnet moves.

4. The electrical system of claim 3, wherein said magnet is inside said support structure and occupies less than the full interior cross-sectional area of said support structure, providing said air flow path around the periphery of said magnet.

5. The electrical system of claim 1, wherein said support structure is a generally tubular enclosure.

6. The electrical system of claim 1, wherein said support structure is arranged for said magnet to move relative to the support structure in response to a generally horizontal movement of the support structure.

7. The electrical system of claim 1, wherein said support structure is arranged to be carried by a person and for said magnet to move in a reciprocating motion relative to the support structure in response to motion of the person.

8. The electrical system of claim 7, wherein said support structure is curved.

9. The electrical system of claim 1, wherein said support structure is housed in a buoyant outer enclosure for relative movement between said magnet and coil that generates an electrical signal in said coil when said outer enclosure is floating on a liquid and subjected to wave action.

10. The electrical system of claim 1, further comprising a suspension system for suspending said support structure so that the support structure moves and causes said magnet to generate an electrical signal in said coil in response to wind striking the support structure.

11. The electrical system of claim 1, wherein said ferrofluid has a viscosity less than 5 centipoise.

12. The electrical system of claim 1, wherein said ferrofluid comprises a light mineral oil medium mixed with isoparaffinic acid.

13. The electrical system of claim 1, further comprising circuitry for coupling energy from said coil out of said generator to said operating system.

14. The electrical system of claim 1, wherein said support structure provides said magnet with a critical angle of displacement from a horizontal static position of less than 1 degree.

15. The electrical system of claim 14, wherein said critical angle of displacement is less than 10 minutes.

16. The electrical system of claim 1, wherein said support structure includes a raceway for said magnet.

17. The electrical system of claim 1, said operating system comprising a battery charger having a battery contact, said coil connected to couple electrical energy to said battery contact in response to relative movement between said magnet and coil.

18. The electrical system of claim 1, said operating system comprising an environmental sensor arranged to produce an output signal indicative of an environmental condition, said coil connected to couple electrical energy to said environmental sensor in response to relative movement between said magnet and coil.

19. The electrical system of claim 18, said sensor including a transmitter energized by said energizing signal for transmitting a signal indicative of said environmental condition.

20. The electrical system of claim 1, said operating system including a battery, said coil connected to couple electrical energy to said battery in response to relative movement between said magnet and coil.

21. The electrical system of claim 1, said coil connected to supply an energizing signal to said operating system in real time.

22. The electrical system of claim 1, further comprising a rectifying circuit, said coil connected to couple electrical energy to said operating system through said rectifying circuit.

23. The electrical system of claim 1, said operating system comprising an emergency signal transmitter, said coil connected to couple electrical energy to said transmitter in response to relative movement between said magnet and coil.

24. The electrical system of claim 1, said operating system comprising a cellular telephone, said coil connected to couple electrical energy to said cellular telephone in response to relative movement between said magnet and coil.

* * * * *